Nov. 7, 1967 F. D. BIGGAM 3,351,819
RELAY FLIP-FLOP CIRCUIT
Filed Aug. 31, 1964
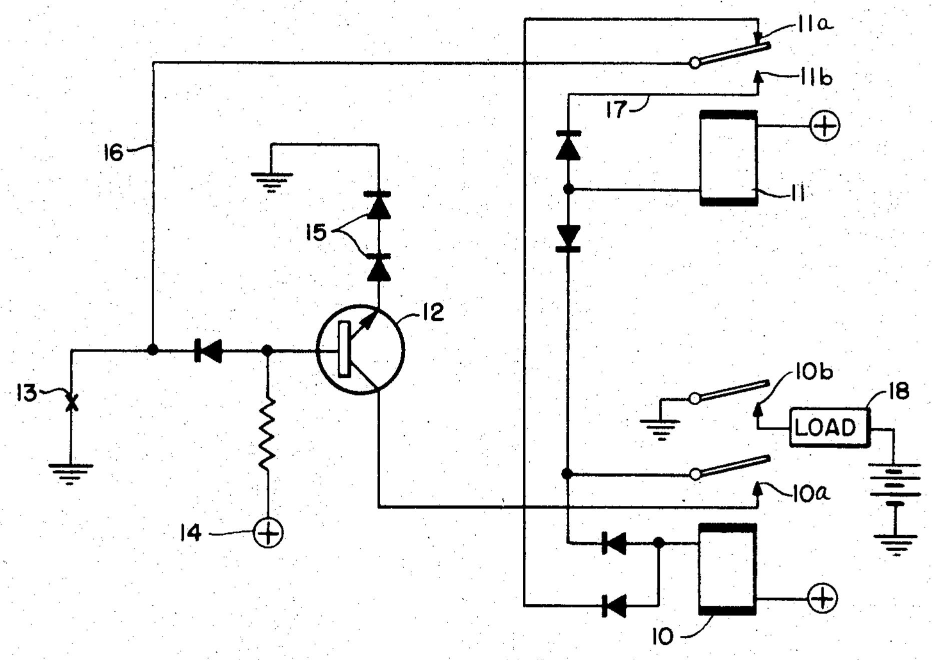
INVENTOR
FRANK D. BIGGAM
BY R. C. Terry
ATTORNEY United States Patent Office 3,351,819
Patented Nov. 7, 1967

3,351,819

RELAY FLIP-FLOP CIRCUIT

Frank D. Biggam, Deerfield, Ill., assignor to Teletype Corporation, Skokie, Ill., a corporation of Delaware Filed Aug. 31, 1964, Ser. No. 393,177
4 Claims. (Cl. 317—140)

ABSTRACT OF THE DISCLOSURE

An input relay of a pair of relays in a relay flip-flop is alternately operated and released by successive momentary closures of a timing contact. The second relay of the pair acts in conjunction with a transistor to provide appropriate operating paths and holding paths for the input relay. Both operation and release of the input relay are directly controlled by the contact closures and are independent of the operate and release times of the second relay.

In modern telegraph systems utilizing high speed transmission over telephone data subsets, telegraph tape readers generally are used to control code reading relays in accordance with the information being read by the reader, with these relays in turn supplying appropriate signals to the telephone subsets to control transmission by the subset accordingly. Telephone data subsets currently in use require timing pulses in synchronization with the operation of the code reading relays that supply the permutation coded signals to the subset, and these timing pulses must be synchronized with the operation of the code reading relays or erroneous operation of the system will result. Due to the fact that telegraph systems operated in conjunction with telephone subsets are generally operated at relatively high speeds (750 to 1000 or more words per minute), any timing variations which take place between the timing pulses and the operation of the code reading relays by the reader contacts may cause an erroneous character to be transmitted from the telephone subset.

Because of the high speed of operation, electronic timing circuits appear to be a logical choice for providing the necessary timing pulses to the telephone subset. It was found, however, that the different response times for the code reading relays and the electronic timing circuits are sufficient to cause errors in the timing of the telephone subset which consequently result in erroneous operation of the system.

Accordingly, it is an object of this invention to use a relay flip-flop for providing output pulses in exact synchronism with the operation of the code reading relays in a high speed telegraph system.

It is another object of this invention to provide a relay flip-flop circuit consisting of a pair of relays in which the operation and release of at least one of the relays is in synchronism with the application of consecutive input signals or pulses with the other relay of the pair being utilized to prepare the proper operate and release paths for the first relay.

It is a further object of this invention in a relay flip-flop to use an additional switching element in conjunction with one of the two relays of the pair of relays constituting the flip-flop circuit to cause consecutive pulses applied to the circuit to alternately operate and release one of the relays in the flip-flop.

In accordance with the preferred embodiment of this invention, a relay flip-flop circuit is operated by the closure of the universal contact in a tape reader supplying the information to be used by the telephone data subset. Initially, both relays of the flip-flop are in a released condition; and upon the first closure of the universal contact, an operate path for the first relay is established. This first relay holds operated, when the universal contact opens, through its own contacts and the emitter-collector circuit of a control transistor which is normally conductive. This same holding path acts as an operate path for the second relay of the pair, the operation of which opens the original operate path for the first relay. The next closure of the universal contact biases the control transistor to nonconduction thereby releasing the first relay in synchronism with the closure of the contact. The second relay of the pair remains operated through a path including its own contacts and the now closed universal contact. When the contact opens, the second relay releases; and the circuit is returned to its original state. The next closure of the universal contact causes operation of the first relay in synchronism with the universal contact closure and the cycle repeats.

Other objects and features of this invention will be apparent to those skilled in the art upon consideration of the following detailed specification taken in conjunction with the drawings, the single figure of which is a schematic circuit diagram of a preferred embodiment of the invention.

Referring now to the drawing, there is shown a relay flip-flop made in accordance with the invention comprising a pair of relays 10 and 11 and an NPN control transistor 12. For the purpose of illustrating the operation of the invention, assume that when power is first applied to the circuit, the relays 10 and 11 are in a released condition and that a universal contact 13, which may be in a conventional tape reader (not shown) is opened. With the circuit in this condition, the control transistor 12 is biased for conduction from a source of positive potential 14 applied to its base to render the potential on the base of the transistor more positive than potential on the emitter which is connected through a pair of diodes 15 to ground. The transistor 12 does not conduct at this time since its collector path is open due to the fact that the make contact 10A of the relay 10 is open when the relay 10 is released.

Once during each cycle of operation of the tape reader with which it is associated, the universal contact 13 closes to complete a path extending from ground through the contact 13 over a lead 16, through the now closed break contact 11A, an isolation diode, and the winding of the relay 10 to a source of positive potential for operating the relay 10. At the same time, ground is applied through the universal contact 13 and an isolating diode to the base of the transistor 12 causing the transistor to be biased to nonconduction or cut off.

When the universal contact 13 opens at the end of the code reading cycle of the reader, the transistor 12 once again is biased to conduction by the positive potential from the source 14; and a holding path for the relay 10 is completed from a source of positive potential through the winding of the relay 10, an isolation diode, the lower make contact 10A, the transistor 12 and the diodes 15 to ground. At the same time, the relay 11 is operated over a path extending from a source of positive potential through the winding of the relay 11, an isolation diode, the lower make contact 10A, the transistor 12, and the diodes 15 to ground. When the relay 11 operates, the break contact 11A is opened; and a make contact 11B is closed. Opening of the break contact 11A opens the original operate path for the relay 10. The circuit then remains in this first stable condition with both relays 10 and 11 operated until the next closure of the universal contact 13.

The next time the universal contact 13 closes, the transistor 12 once again is biased to a state of nonconduction. This causes the relay 10 to be released since the holding path for the relay 10 through the transistor 12 is broken when the transistor 12 is rendered nonconductive. The relay 11 is held operated over a path extending from ground through the universal contact 13 over the conductor 16, through the now closed make contact 11B of the relay 11, over the conductor 17, through an isolation diode and the winding of the relay 11 to a source of positive potential. Thus, so long as the universal contact 13 remains closed, the relay 10 remains released and is prevented from operating due to the fact that the relay 11 remains operated during this period.

It is to be noted that the release of the relay 10 is initiated immediately upon the closure of the universal contact 13. When the universal contact 13 opens, the holding path through the contact 13 for the relay 11 is opened; and the relay 11 is released. The transistor 12 then is biased for conduction and the circuit is in its original state, so that the next closure of the contact 13 causes operation of the relay 10 in synchronism with the closure of the contact 13.

From the foregoing description it can be seen that the operation of the relay 10 follows each closure of the universal contact 13; that is, upon the first closure of the contact 13, the relay 10 operates and upon the next closure of the contact 13 the relay 10 is released, and so on. The relay 11 acts merely as a control relay and no critical timing transitions are handled by the relay 11.

An upper make contact 10B of the relay 10 may be utilized to supply the necessary transition timing pulses to a suitable load 18, such as a telephone data subset. The flip-flop of this invention is operated as a complementary relay flip-flop with consecutive input pulses obtained by the closure of the universal contact 13 causing operation and release alternately of the relay 10 in synchronism with the input pulses.

The relay flip-flop of this invention is particularly well suited for operation with systems in which the pulses that operate the flip-flop also are utilized to operate other relays such as the code reading relays operated by a tape reader for supplying information to a telephone data subset, because any time delays inherent in the operation of the relays are compensated for in the operation of the flip-flop circuit since the same type of relays may be used for the code reading relays and for the flip-flop relays. As a consequence the response time of the relay flip-flop circuit is the same as that of the code reading relays in conjunction with which it is operated, and the timing pulses supplied by the flip-flop coincide with the operation of the code reading relays.

Although this invention has been described in conjunction with a preferred embodiment thereof as illustrated in the drawing, the invention is not to be considered limited to the embodiment chosen for purposes of illustration; but various changes and modifications will be apparent to those skilled in the art without departing from the spirit and scope of the invention.

What is claimed is:

1. A relay flip-flop including:
first and second relays;
a source of pulses;
first means controlled by the second relay for applying a first pulse from the pulse source to the first relay to operate the first relay when the second relay is released;
a switch which closes upon termination of the first pulse for holding the first relay operated and for operating the second relay, the operation of the second relay disabling the first means; and
third means controlled by the second relay and an applied pulse from the pulse source for holding the second relay operated during receipt of a second pulse from the pulse source, the receipt of the second pulse opening the switch, the third means being disabled upon termination of the second pulse.

2. A bistable relay circuit including:
first and second relays;
a source of pulses;

an electronic switching device normally biased for conduction;
means for applying each of the pulses from the pulse source to the switching device to bias it to nonconduction for the duration of each pulse;
means for applying a first pulse from the pulse source to the first relay to operate the first relay when the second relay is released;
means including the switching device for holding the first relay operated and for operating the second relay upon operation of the first relay and termination of the first pulse, the operation of the second relay disabling the first relay operating means;
means for holding the second relay operated during receipt of a second pulse from the pulse source, the second pulse rendering the switching device nonconductive thereby disabling the first relay holding means, the second relay holding means being disabled upon termination of the second pulse.

3. A bistable relay circuit including:
first and second relays;
a source of pulses;
an electronic switching device normally biased for conduction;
means for applying each of the pulses from the pulse source to the switching device to bias it to nonconduction for the duration of each pulse;
means controlled by the second relay for applying a first pulse from the pulse source to the first relay to operate the first relay when the second relay is released;
means including the switching device for holding the first relay operated and for operating the second relay upon operation of the first relay and termination of the first pulse, the operation of the second relay disabling the first relay operating means;
means controlled jointly by the second relay and an applied pulse from the pulse source for holding the second relay operated during receipt of a second pulse from the pulse source, the second pulse rendering the switching device nonconductive thereby disabling the first relay holding means, the second relay holding means being disabled upon termination of the second pulse.

4. A relay bistable multivibrator including:
a direct current voltage source;
a keying device in series with the source;
a control transistor normally biased for conduction;
means operative during closure of the keying device for biasing the transistor to nonconduction;
a first relay having first make contacts;
a second relay having second make contacts and first break contacts;
a first operating circuit for the first relay including the source, the keying device, the first break contacts, and the winding of the first relay connected in series;
a holding circuit for the first relay including the source, the control transistor, the first make contacts and the winding of the first relay connected in series;
an operating circuit for the second relay including the source, the control transistor, the first make contacts, and the winding of the second relay connected in series; and
a holding circuit for the second relay including the source, the keying device, the second make contacts, and the winding of the second relay connected in series.

References Cited

UNITED STATES PATENTS

| | | | |
|---|---|---|---|
| 3,025,433 | 3/1962 | Rogers | 317—140 |
| 3,067,363 | 12/1962 | Fleckenstein | 317—140 |

MILTON O. HIRSHFIELD, *Primary Examiner.*

L. T. HIX, *Assistant Examiner.*